United States Patent [19]

Kunieda et al.

[11] 4,154,208

[45] May 15, 1979

[54] ROTARY ENGINE

[76] Inventors: Eiichi Kunieda; Yoshiko Kunieda, both of 5-22 Kaneda-cho, Kita-ku, Nagoya-shi, Aichi-ken, Japan

[21] Appl. No.: 867,194

[22] Filed: Jan. 5, 1978

Related U.S. Application Data

[62] Division of Ser. No. 702,147, Jul. 2, 1976, abandoned.

[30] Foreign Application Priority Data

Jul. 5, 1975 [JP] Japan .................................. 50-82894
Dec. 1, 1975 [JP] Japan ............................... 50-144147
Dec. 23, 1975 [JP] Japan ............................... 50-153559
Dec. 29, 1975 [JP] Japan ............................... 50-157947
Dec. 29, 1975 [JP] Japan ............................... 50-157948

[51] Int. Cl.² .......................................... F02B 53/06
[52] U.S. Cl. .................................. 123/236; 123/238; 123/240; 418/198; 418/260
[58] Field of Search ............... 123/214, 222, 235, 236, 123/240

[56] References Cited

U.S. PATENT DOCUMENTS

| 1,649,091 | 11/1927 | Zimmer | 123/236 X |
| 1,899,374 | 2/1933 | Werle | 123/240 |
| 1,923,561 | 8/1933 | Winckler | 123/240 |
| 3,951,111 | 4/1976 | Lester | 123/235 |

FOREIGN PATENT DOCUMENTS

| 609464 | 5/1926 | France | 123/214 |
| 338976 | 3/1936 | Italy | 123/240 |

Primary Examiner—Carlton R. Croyle
Assistant Examiner—Michael Koczo, Jr.
Attorney, Agent, or Firm—Connolly and Hutz

[57] ABSTRACT

Rotary engine having an annular space formed between the housing and the rotor, the annular space being divided into an intake-compression chamber and air expansion-exhaust chamber.

2 Claims, 40 Drawing Figures

FIG. 26
FIG. 27
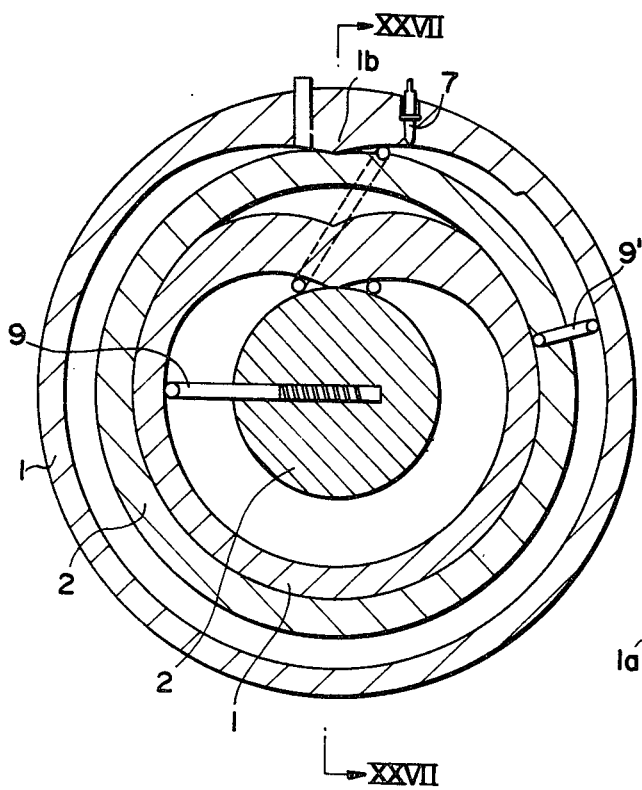
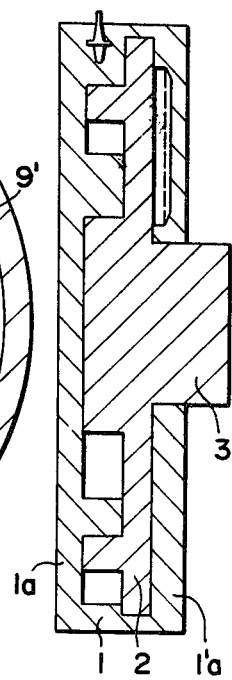

ROTARY ENGINE

CROSS REFERENCE TO RELATED APPLICATIONS

This application is a divisional application of U.S. application Ser. No. 702,147, filed July 2, 1976, now abandoned.

BACKGROUND OF THE INVENTION

1. Field of the Invention

The present invention relates to a new type rotary engine.

2. Description of the Prior Art

In the conventional rotary engines including the Wankel type all the four strokes of intake, compression, expansion and exhaust take place in the same engine chamber, and such a structure is accompanied with various difficulties in design, performance, configuration and manufacture.

SUMMARY OF THE INVENTION

The primary object of the present invention is to provide a rotary engine with its structure simplified through division into an engine chamber intended for intake and compression and an engine chamber intended for expansion and exhaust.

Another object of the present invention is to provide a rotary engine characterized in that the compression ratio of the gas moving from the intake-compression chamber to the expansion-exhaust chamber can be maintained approximately constant by providing a stepped part near the communication passage linking the two chambers.

Still another object of the present invention is to provide a rotary engine characterized in that the compression ratio of the gas moving between the two engine chambers can be maintained approximately constant by employing a rotary seal as means to divide the intake zone and the compression zone in the intake-compression chamber and as means to divide the expansion zone and the exhaust zone in the expansion-exhaustion chamber.

Still another object of the present invention is to provide a rotary engine equipped with a rotary seal, characterized in that the rotary seal can be prevented from being rotated by a gas pressure.

Still another object of the present invention is to provide a rotary engine whose performance is enhanced by a gas seal working according to a differential gas pressure, the gas seal being provided in the passage communicating the intake-compression chamber with the expansion-exhaustion chamber, and rotating together with the rotor.

BRIEF DESCRIPTION OF THE DRAWINGS

The objects and features of the invention will become apparent to those skilled in the art as the disclosure is made in the following description of a preferred embodiment of the invention, as illustrated in the accompanying drawings, in which:

FIG. 20 to FIG. 26 are section views or cutaway oblique views of another embodiment of the present invention in which the dividing means is integrated with the internal wall of the housing.

FIG. 27 is a section view along the line XXVII—XXVII of FIG. 26.

DESCRIPTION OF THE PREFERRED EMBODIMENT

Figure 1:
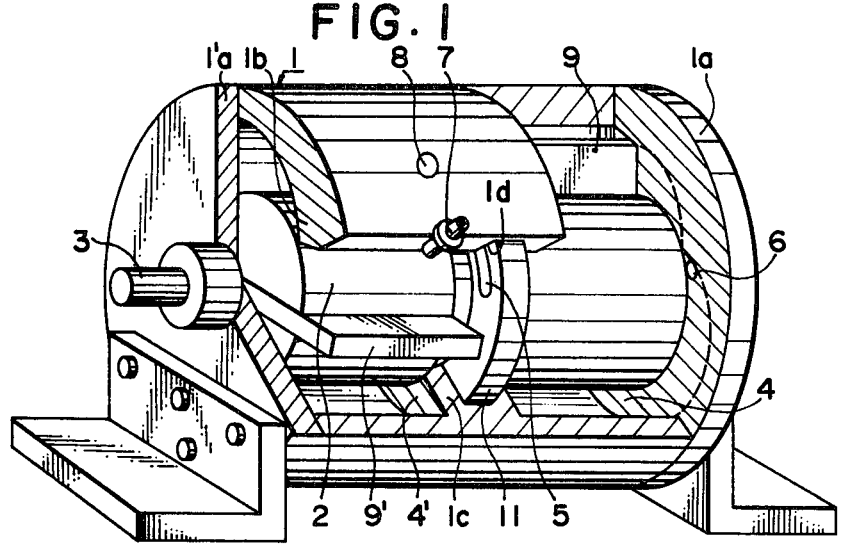
FIG. 1 is a partially cutaway oblique view of a rotary engine according to the present invention, in which the dividing means is integrated with the housing.

In FIG. 1, a cylindrical housing 1 with end plates 1a, 1a' at both ends internally holds a free-rotatable rotor 2 and the rotor shaft 3 supporting the rotor 2 penetrates the end plate 1a of the housing 1 to transmit the rotation of the rotor 2 out of the housing 1. Between the housing 1 and the rotor 2, there are at least two annular spaces formed which are mutually separated by the dividing wall 1c. One of said annular spaces constitutes the intake-compression engine chamber 4 for intake and compression and the other constitutes the expansion-exhaustion engine chamber 4' for expansion and exhaust. The engine chambers 4,4' are constituted by dividing the annular spaces circumferentially into plural divisions by the dividing means provided on the housing 1 and the sealing piece provided on the rotor 2.

Between the two engine chambers 4,4' there is provided a passage 5 communicating said chambers 4,4', said passage 5 can be opened or closed. The suction-compression chamber 4 is equipped with a intake port 6 for the mixed gas, and the expansion-exhaust chamber 4' is equipped with an ignition means 7, say, a sparking plug, and an exhaust port 8.

In FIG. 1 illustrating an embodiment of the invention in which the dividing means is integrally formed on the internal wall of the housing 1, the dividing means 1b smoothly projects radially inward and its tip is in sliding contact with the periphery of the rotor 2.

Figure 2:
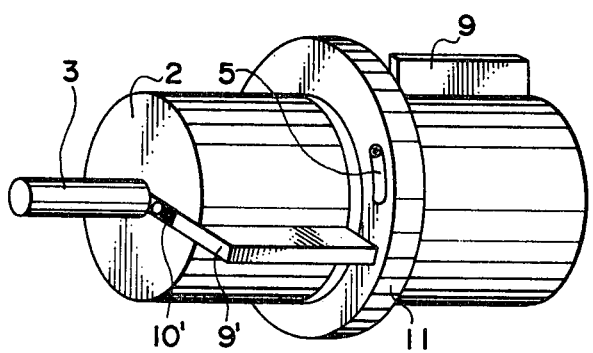
FIG. 2 is an oblique view of the rotor as taken out of the rotary engine in FIG. 1.

In FIG. 2 which selectively shows the rotor 2 in the above embodiment, the rotor 2 is equipped with at least one sealing piece 9,9' for each of the engine chambers 4,4'. The sealing pieces 9,9' are urged by the spring means 10,10' from inside toward outside of the rotor 2 so that they can rotate in contact with the internal wall of the housing 1 when the rotor 2 turns. The dividing means 1b provided on the internal wall of the cylindrical housing is in contact with the periphery of the rotor 2; accordingly said sealing pieces 9,9', when pressed by the internal wall of the housing 1, can go down to the same level with the periphery of the rotor 2.

The dividing wall 1c which divides the annular space formed between the housing 1 and the rotor 2 at least into two divisions is integrally provided on the housing 1; and the inside of the dividing wall 1c, which protrudes on the side of the rotor 2, can make sliding contact with the outside of the rotor 2.

An inward-opening groove 1d is provided on the dividing wall 1c and into the groove 1d slidably fits a shield plate 11 which is fitted to or integrated with the rotor 2.

Figure 3:
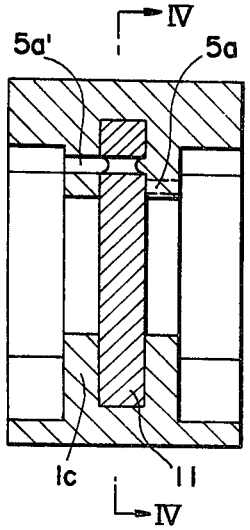
FIG. 3 is a section view showing the vicinity of the dividing wall in the rotary engine in FIG. 1.
Figure 4:
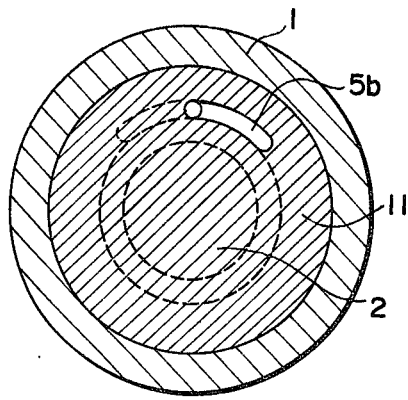
FIG. 4 is a section view along the line IV-IV in FIG. 3.

FIGS. 3 and 4 illustrate the structure of the passage 5 near said shield plate 11. The passage 5 consists of paths 5a,5a' provided on the dividing wall 1c and a long slot 5b provided on the shield plate 11. The paths 5a,5a' are bored on the dividing wall 1c on both sides of the shield plate 11 in such manner that they communicate from the side surface of the shield plate 11 to the chambers 4,4'. The paths 5a,5a' may be located mutually staggering in the rotational direction relative to the part where the tip of the dividing means 1b on the internal wall of the housing 1 contacts the rotor 2. Meanwhile the long slot 5b provided on the shield plate 11 radially extends so that the paths 5a,5a' can communicate with each other via the long slot 5b as the shield plate 11 turns.

Figure 5:
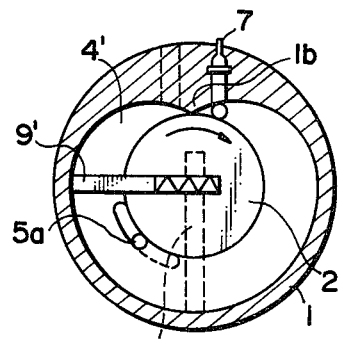
FIG. 5 to FIG. 7 are section views illustrating the working state of the rotary engine in FIG. 1.
Figure 6:
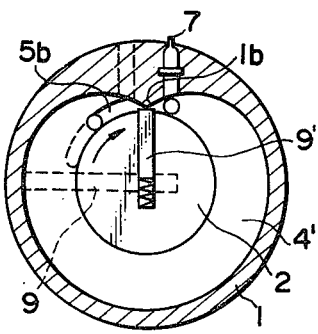
Figure 7:
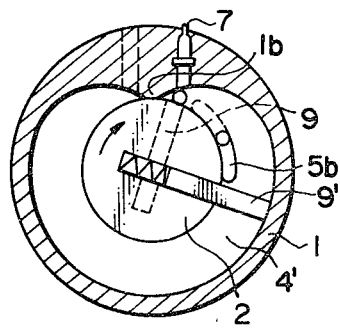
Figure 8:
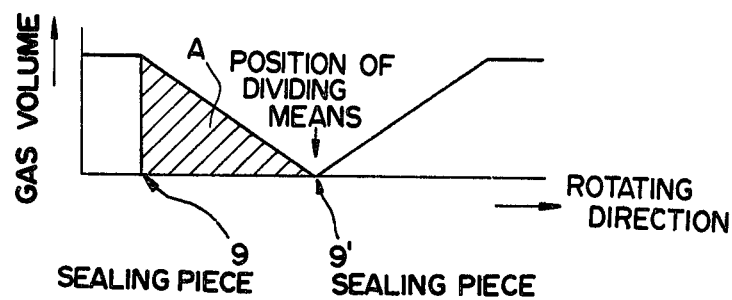
FIG. 8 to FIG. 10 are diagrams showing the changes in the volume of the gas moving between the two engine chambers, corresponding to FIGS. 5 to 7.
Figure 9:
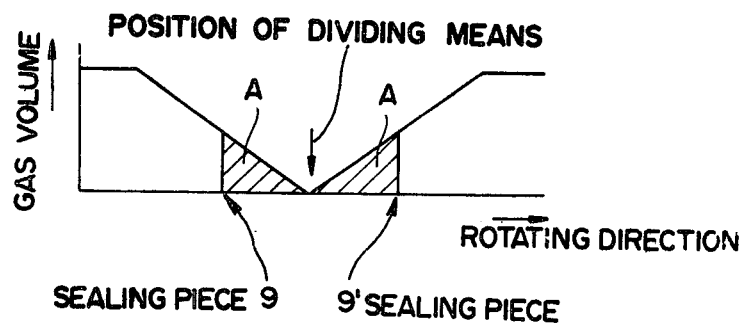
Figure 10:
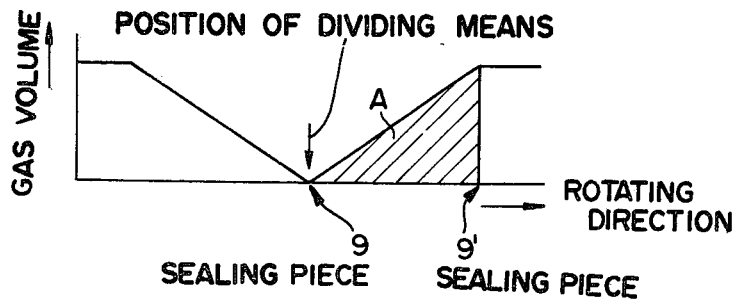
Figure 11:
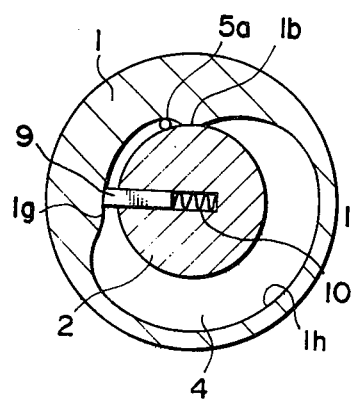
FIG. 11 to FIG. 13 are section views illustrating the working state of the intake-compression chamber when a projection is provided on the internal wall of the housing.
Figure 12:
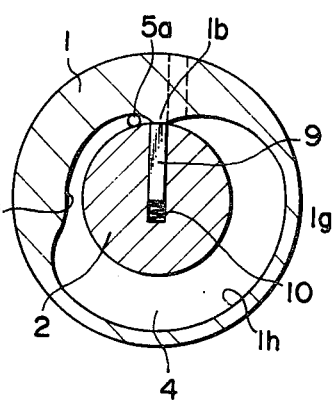
Figure 13:
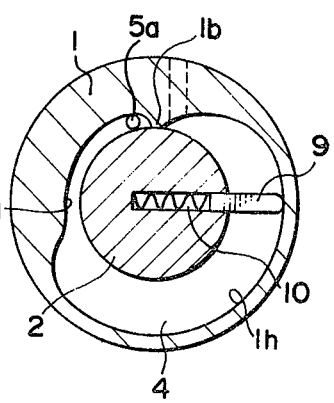
Figure 14:
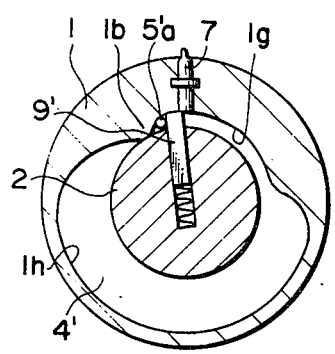
FIG. 14 to FIG. 16 are section views, corresponding to FIGS. 11 to 13, which illustrate the working state of the expansion-exhaustion chamber when a projection is provided on the internal wall of the housing.
Figure 15:
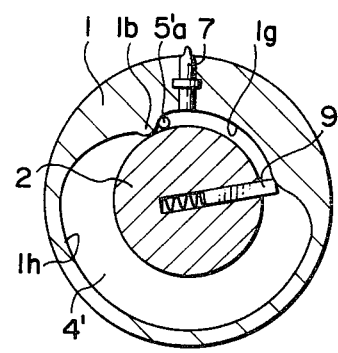
Figure 16:
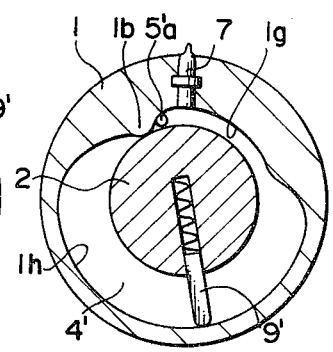
Figure 17:
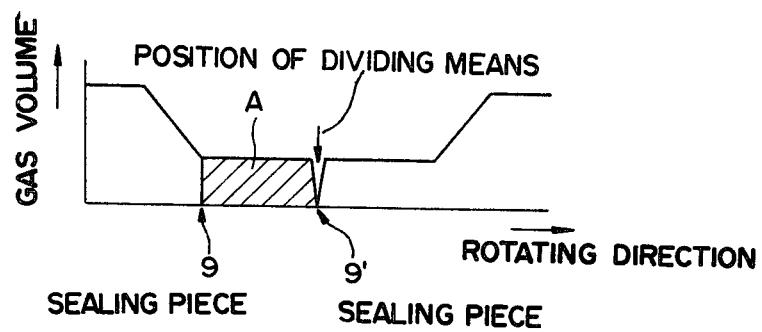
FIG. 17 to FIG. 19 are diagrams, corresponding to FIGS. 11 to 13, which show the changes in the volume of the gas moving between the two engine chambers.
Figure 18:
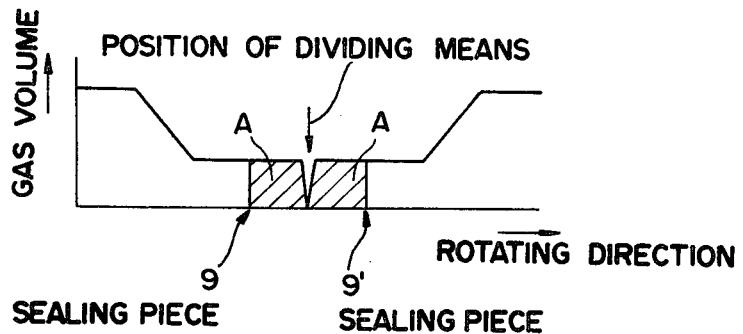
Figure 19:
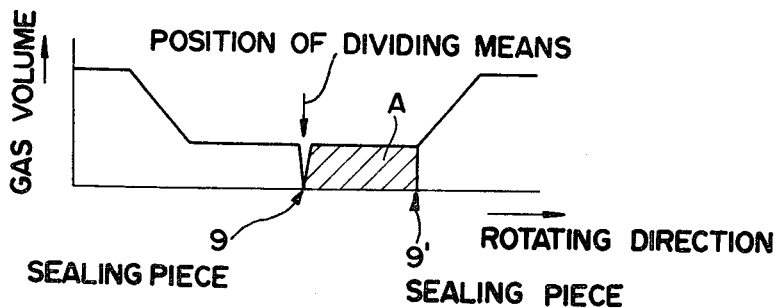

FIGS. 5, 6 and 7 illustrate the working state of the engine in FIG. 1. In an engine having the dividing means 1b of a sectional profile such as illustrated in FIGS. 5, 6 and 7, the volume of the gas moving from the chamber 4 to the chamber 4' changes as illustrated in FIGS. 8 to 10, whereby the compression ratio of the moving gas changes, too. To prevent such a change in the compression ratio, as illustrated in FIGS. 11 to 16, the part 1g of the internal wall of the housing 1, where the sealing pieces 9,9' come into sliding contact with the long slot 5b brings the paths 5a,5a' into communication and as the result the compressed gas goes from the chamber 4 to the chamber 4', protrudes closer towards the rotor 2 than the part 1h where the sealing pieces 9,9' come into sliding contact when the long slot 5b cancels the communication between the paths 5a,5a'; and the transition between the two parts is smoothly stepped. Thus, the volume of the gas moving between the chambers 4,4' can be changed as illustrated in FIGS. 17 to 19 and in consequence the compression ratio of the moving gas can be maintained approximately constant.

Several examples of engines of such type that the dividing means 1 is fitted to the housing 1 are here to be illustrated.

Figure 20:
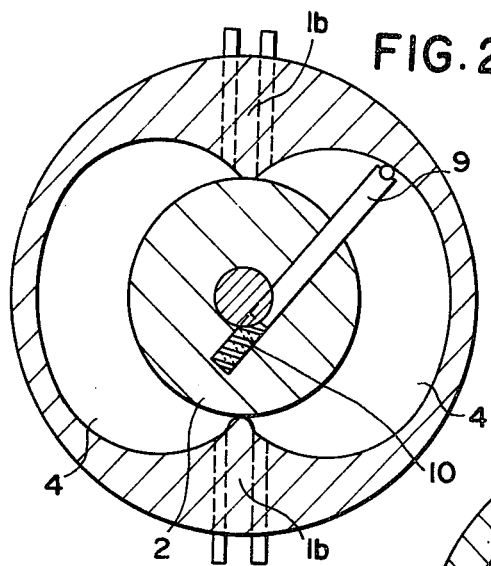

FIG. 20 is an example of several dividing means 1b being provided on the housing 1 (two dividing means in this example). In such an engine with two dividing means 1b, 1b' provided on the internal wall of the housing 1, intake-compression and expansion-exhaust takes place twice in one rotation of the rotor shaft 3.

Figure 21:
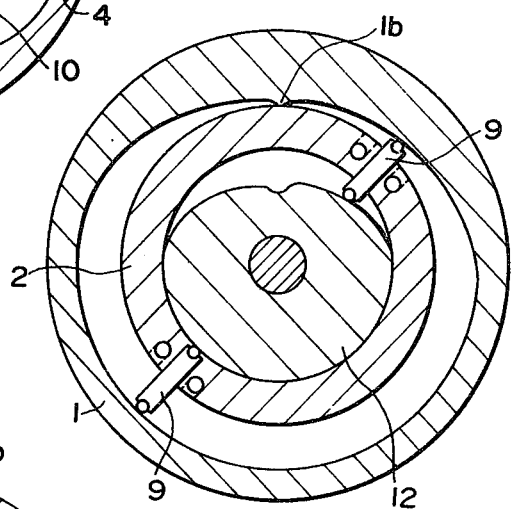

FIG. 21 shows another embodiment, in which the sealing pieces 9,9' are moved radially without aid of a spring force. In this case, an inner wheel 12 with external configuration following the contour of the dividing means 1b protruding on the internal wall of the housing 1 is provided within the rotor 2; sealing pieces 9,9' are interposed between the internal wall of the housing and the inner wheel 12; and the sealing pieces 9,9' can be moved by rotation of the rotor 2.

Figure 22:
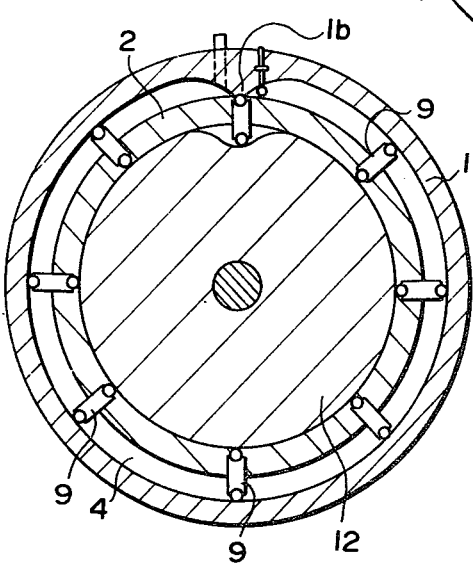

In FIG. 22 is illustrated still another embodiment, in which one protruding dividing means 1b is provided on the internal wall of the housing 1 and a stationary inner wheel 12 with an external configuration following the contour of the means 1b is set within the rotor 2 which slidably holds 8 sealing pieces 9,9' . . . in radial direction. This is a single-plug engine with 8 explosion chambers which works the same as an 8-cylinder engine. In this example 8 sealing pieces are provided, but it is generally possible to constitute an engine equivalent in performance to an n-cylinder engine by providing n-sealing pieces.

Figure 23:
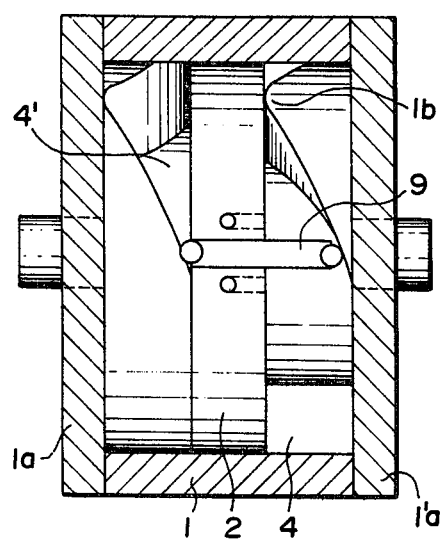

In FIG. 23 is illustrated still another embodiment, in which the dividing means 1b and the sealing pieces 9 are provided axially with the same performance and function, instead of radially as in the proceding embodiments.

Figure 24:
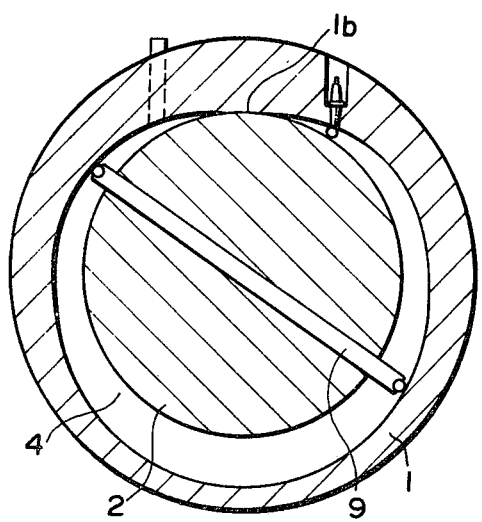

In FIG. 24 is illustrated still another embodiment, in which the sectional profile of the internal wall of the housing 1 is generally circular and eccentric to the periphery of the rotor 2. The diameter of this general circle is equal to the length of the sealing piece 9, the sealing pieces 9, which penetrate the rotor 2, have a constant length and are rotatable, being pressed against the internal wall of the housing 1. As there are two sealing pieces on the circumference, the engine performs the same function as a two-cylinder engine.

Figure 25:
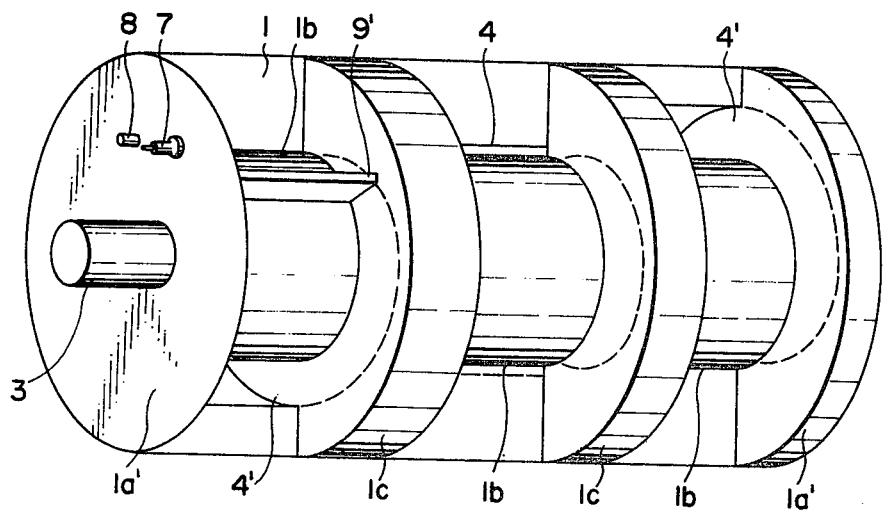

FIG. 25 illustrates an engine in which the expansion-exhaust chamber 4' is connected to each side of the intake-compression chamber 4; this structure can increase the torque of the engine.

FIGS. 26 and 27 illustrate an engine which are internally and externally equipped with the intake-compression chamber 4 and the expansion-exhaust chamber 4'; thereby the axial length of the engine can be reduced.

In the above cases, the dividing means 1b is integrated with the housing 1, but the dividing means 1b may be substituted by a rotary seal; and in that case, the embodiment will be as follows.

Figure 28:
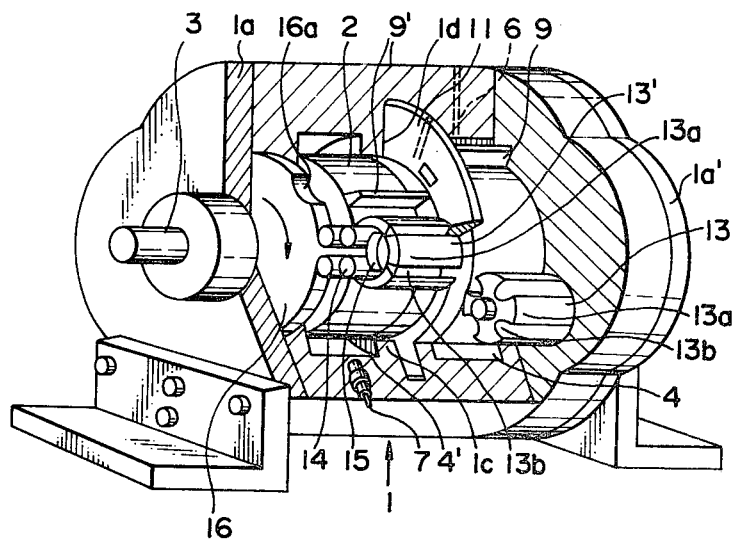
FIG. 28 is a partially cutaway oblique view of a rotary engine which employs a rotary seal as the dividing means.
Figure 29:
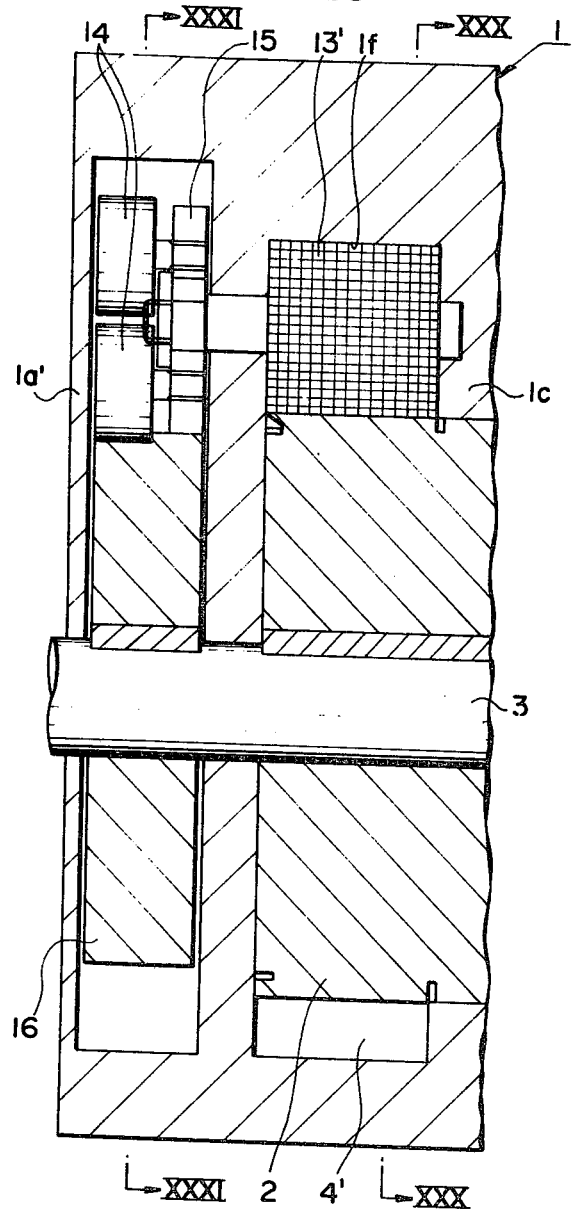
FIG. 29 is a section view of the engine illustrated in FIG. 28.
Figure 30:
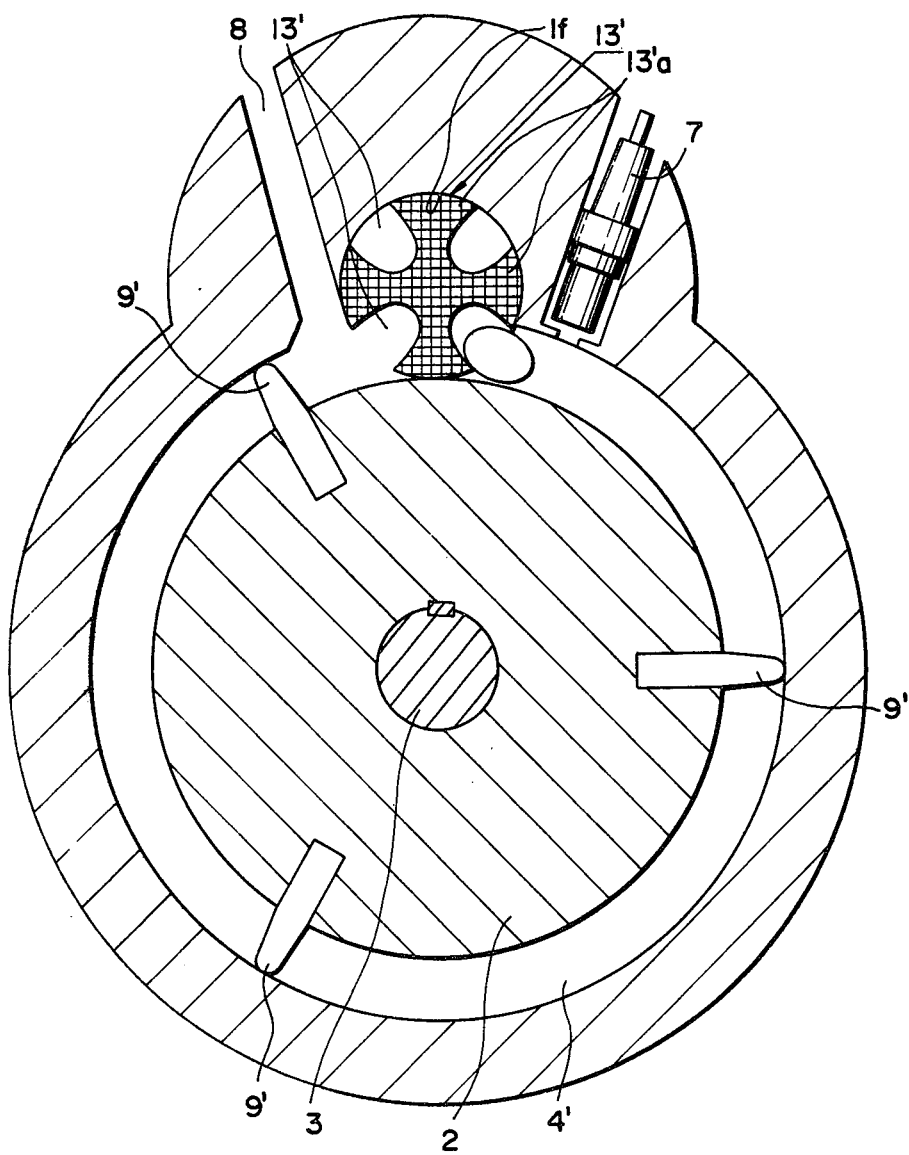
FIG. 30 is a section view along the line XXX—XXX of FIG. 29.
Figure 31:
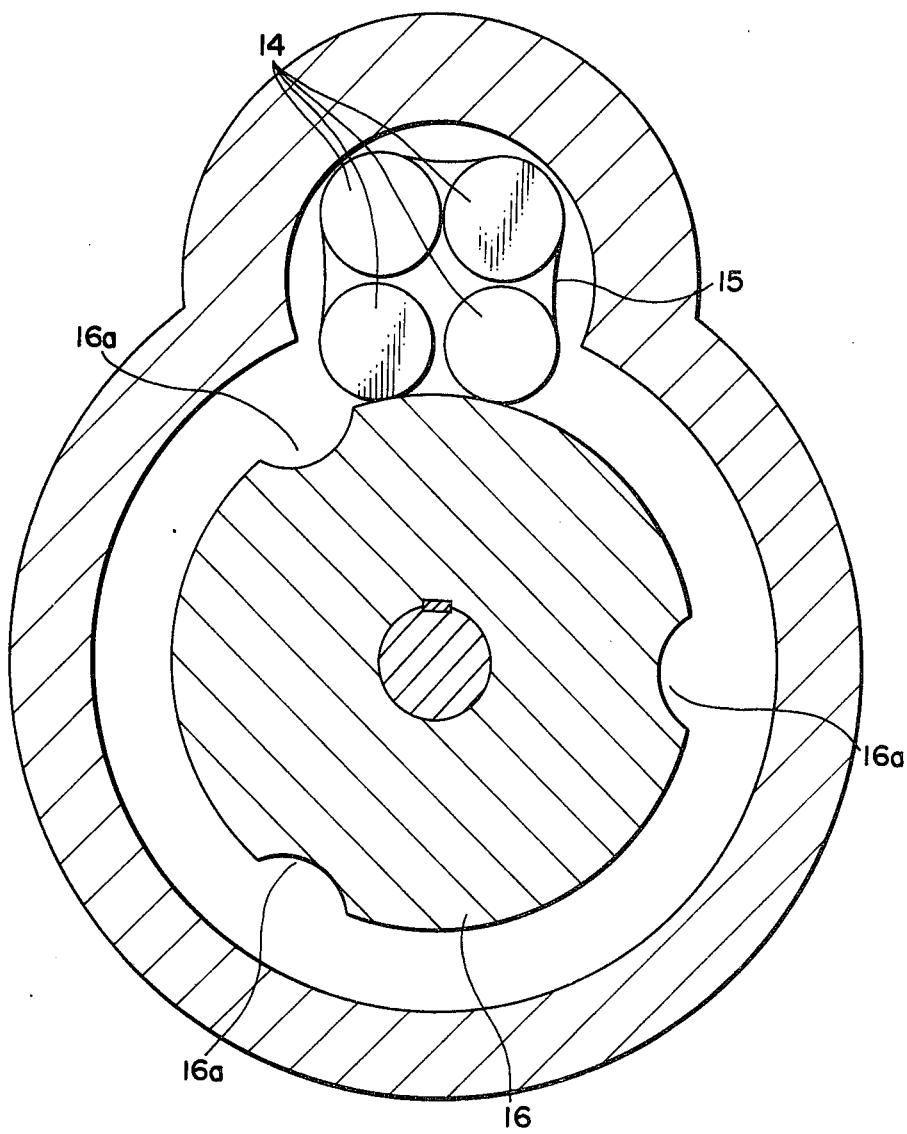
FIG. 31 is a section view along the line XXXI—XXXI of FIG. 29.

In FIG. 28, the intake-compression chamber 4 is equipped with a rotary seal 13 and the expansion-exhaust chamber 4' is also equipped with a rotary seal 13'. The rotary seals 13,13' are rotatably fitted within the recess 1f of the housing 1, with both their end faces and cylindrical surfaces fitted to the inside surface of the recess 1f to prevent a bypassing of the gas. The rotary seals 13,13' have plural blades, for example four blades 13a,13a' . . . in the figure. Between the blades 13a or 13a' there are formed the grooves 13b, 13b' which can airtightly engage with the tips of the sealing pieces 9,9' when the pieces rotate. FIGS. 29 to 31 show a structural detail of the rotary seal 13' in the expansion-exhaust chamber 4'of the two engine chambers 4,4'.

Figure 32:
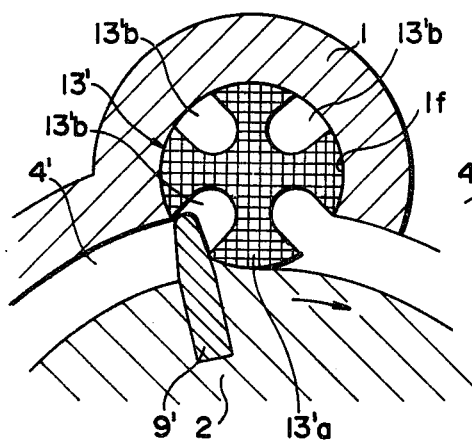
FIGS. 32 and 33 are section views illustrating the working of the rotary engine.
Figure 33:
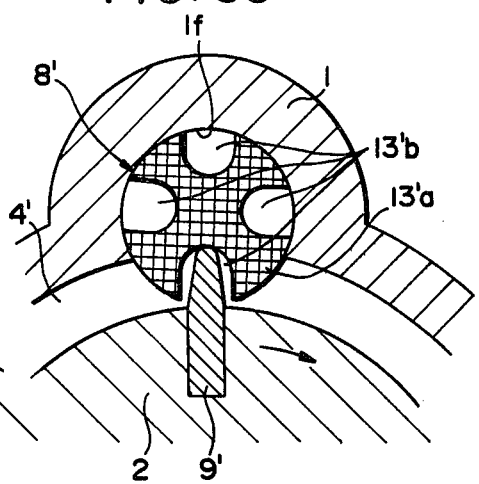

FIGS. 32 and 33 show the state of fit between the sealing piece 9' and the groove 13b while the rotor 2 is in rotation. A structural detail of the rotary seal 13 is approximately same as that of the rotary seal 13'.

The rotary seal 13 which separates the intake zone and the compression zone in the chamber 4 and the rotary seal 13' which separates the expansion zone and the exhaust zone in the chamber 4', are subjected to the torque due to the pressure difference between the two zones. If these seals are allowed to rotate freely, they will be able to perform the sealing function; therefore, they must remain immovable even if subjected to a strong gas pressure, while at other times they must be rotatable when the sealing pieces 9,9' pass.

A stop mechanism is therefore added to this engine, FIGS. 29 and 31 illustrating such a stop mechanism as provided in the expansion-exhaust chamber 4'. Description of the stop mechanism is confined to the case of the chamber 4', because the mechanism provided in the intake-compression chamber 4 is identical with the one in the chamber 4'. In these figures, 14 is a cam floor, which is provided in the same number as the blade 13a in the rotary seal 13; and it is fixed to a cam-floor support 15. The cam-floor support 15 is fitted on the same shaft that carries the rotary seal 13 in such manner that it can rotate together with the rotary seal 13. On the rotor 2, on the other hand, a cam plate 16 is fitted to the rotor shaft 3 in such manner that it can rotate together with the rotor 3. The cam plate 16 is set on the same plane that contains said cam floor 14 in slidable contact with the cam floor. On the periphery of the cam plate 16 there are as many cam grooves 16a as sealing pieces 9. The cam groove 16a is of such a depth that when the cam plate 16 turns to coincide with the cam floor 14, the cam floor 14 can rotate fitting into the cam groove 16a. Thus, the group of cam floors 14 subjected to a torque by the rotary seal 13 tends to rotate but it cannot when the cam floor 14 is in contact with any surface other than the surface of the cam groove 16a; and only when the cam floor 14 and the cam groove 16a happen to meet, the group of cam floors 14 is permitted to rotate.

Figure 34:
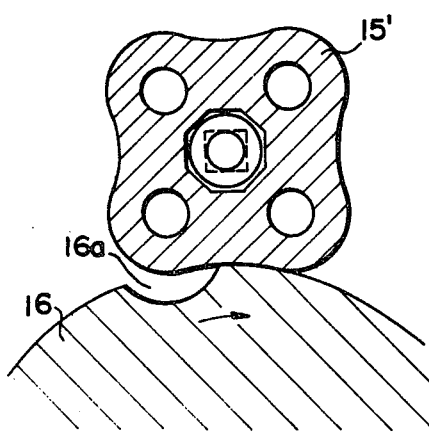
FIGS. 34 and 35 are section views showing parts of a Geneva gear employed as means to prevent rotation of the rotary seal due to a gas pressure.
Figure 35:
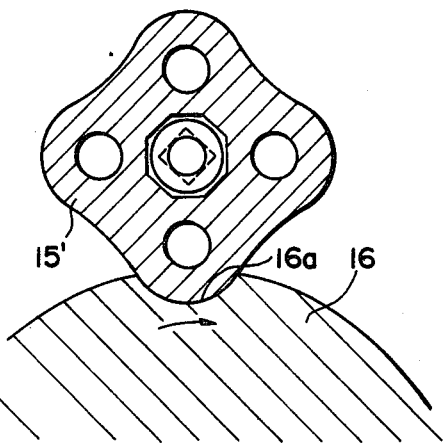

The rotation-stop mechanism illustrated in FIG. 31 is a mere example and many other designs performing the same function are conceivable. FIGS. 34 and 35 show variations in design, in which use of an integrated version 14' of the cam floor 14 is illustrated. In addition to the above use of Geneva stop and cam, use of ratchet or gear mechanism is also available.

Figure 36:
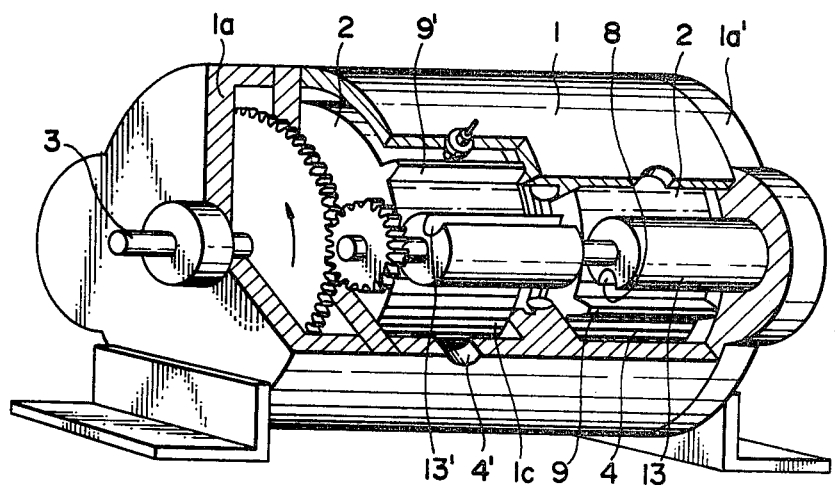
FIG. 36 is a partially cutaway oblique view of a rotary engine in which the rotary seal and the rotor are interlocked by a gear.
Figure 37:
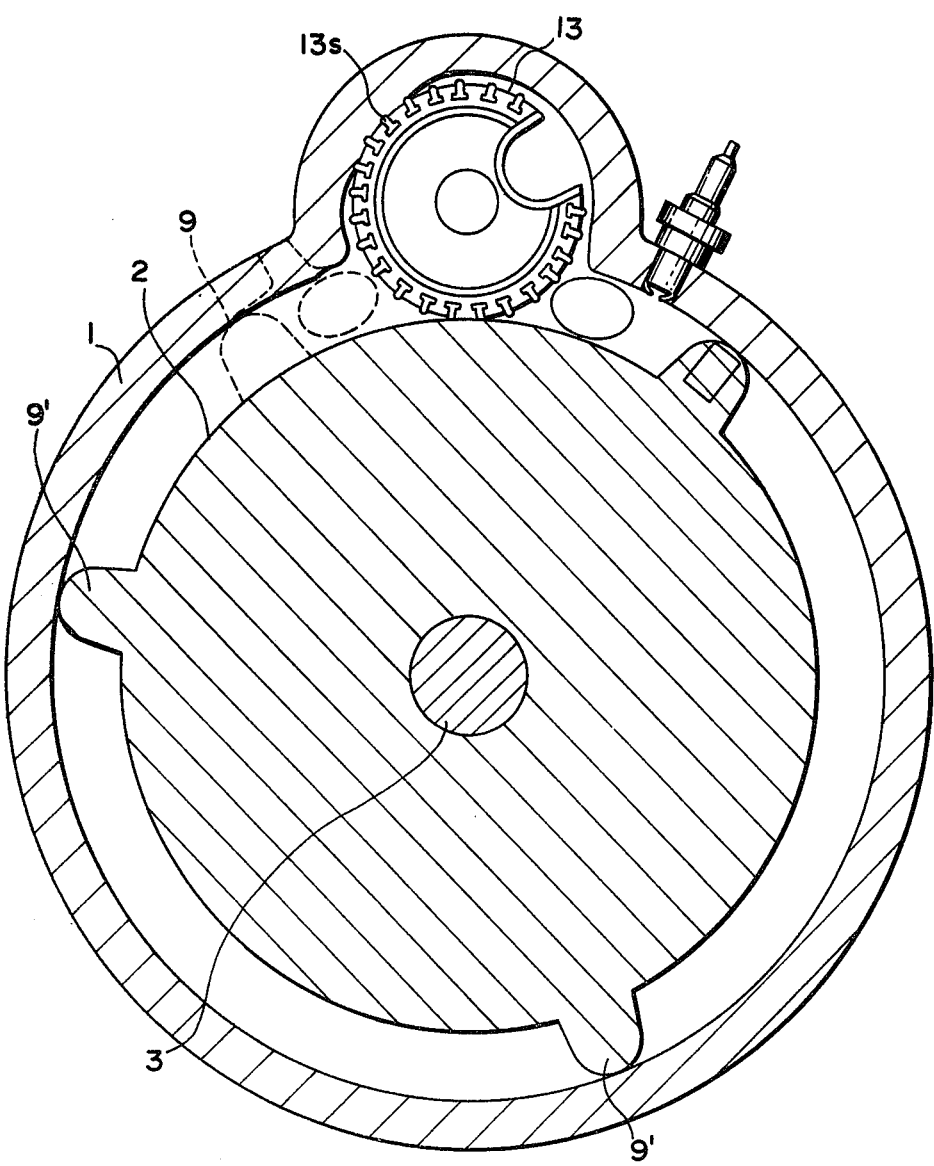
FIG. 37 is a section view of the rotary engine illustrated in FIG. 36.

FIG. 36 illustrates an engine in which the rotary seal 13 and the rotor 2 are interlocked by means of gearing, FIG. 37 being a cross section view of this engine; in this example, many sealing pieces 13s are provided on the periphery of the rotary seal 13 to complete the sealing between the intake zone and the compression zone or between the expansion zone and the exhaustion zone. The sealing pieces 13s may be provided on the periphery of the rotor 2.

Figure 38:
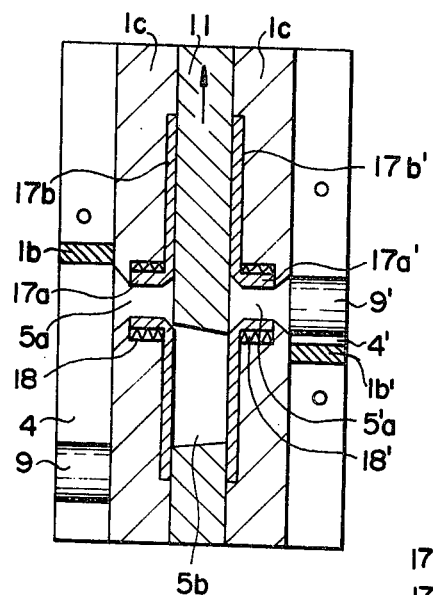
FIG. 38 to FIG. 40 are section views showing the gas sealed condition of the passage which is provided with a gas seal.
Figure 39:
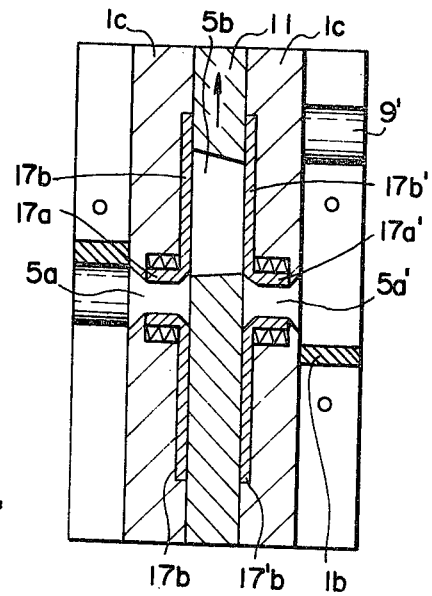
Figure 40:
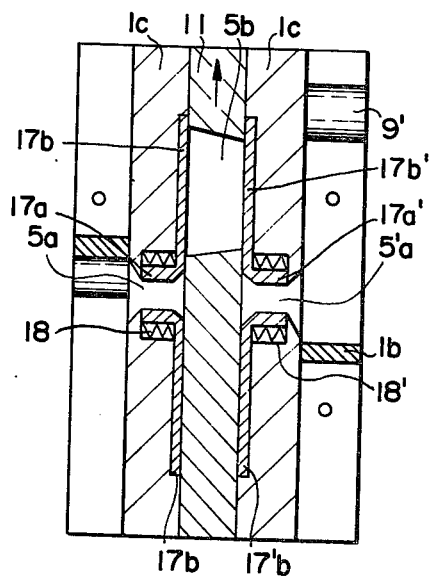

Meanwhile, for the purpose of effectively preventing the gas from bypassing through the passage 5, a gas seal 17 may be provided in the passage 5. Such a case is to be described referring to FIGS. 38 to 40. The paths 5a,5a' hold the sealing tubes 17a,17a' which internally have a through hole and whose periphery comes into close fit with the inner surfaces of the paths 5a,5a'. On the side of shield plate 11, the sealing tubes 17a,17a' terminate as flanges 17b,17b' which circumferentially extend to cover up the long slot 5b. Meanwhile the spring means 18,18' all the time urge the sealing tubes 17a,17a' to press the shield plate 11. Holes in said flanges 17b,17b' are made nearly rectangular for the purpose to neatly cut off the gap passing therethrough at start and end. FIGS. 38 to 40 illustrate the sectional state of the passage 5 when the long slot 5b rotates against the paths 5a,5a' whose centerlines coincide each other. In these figures the action of the gas seal when the gas goes from the intake compression chamber 4 to the expansion-exhaust chamber 4' is shown. FIG. 38 shows a state when the gas compressed by the sealing piece 9 has attained a specific compression ratio; in this state, communication is established between the path 5a and the long slot 5b, but no communication is yet established between the path 5a' and the long slot 5b, thereby the chamber 4' being still in low pressure condition. Next, when the shield plate 11 turns in the arrow direction to establish communication between the two chambers 4,4' and after a movement of the gas, the chield plate 11 farther turns, the state of FIG. 39 is reached. In this state, the pressurized gas at the long slot 5b passes through the path 5a and partially returns to the intake-compression chamber 4, but the gas which has moved into the expansion-exhaust chamber 4' cannot return to the intake-compression chamber 4, because the flange 17b' is pressed against the shield plate 11 on account of the pressure difference between the two chambers and the spring force. Further turning of the shield plate 11 brings about the state of FIG. 40, in which the paths 5a, 5a' are perfectly blocked to the passage 5b, thereby fully isolating the two chambers 4,4'. Ignition is done in this state by the sparking plug 7. Upon explosion, a higher pressure builds up in the expansion-exhaust chamber 4', but the pressure difference between the chambers 4,4' presses the flange 17b' more strongly against the shield plate 11, thereby rendering the gas seal firmer. Thus provision of flanges 17b,17b' in both chambers 4,4' assures perfect sealing, regardless of the pressure buildup in either chamber.

In any embodiment of a rotary engine with the above constitution, when the rotor 2 turns, the portion of gas located forward in the rotating direction of the sealing piece 9 in the engine chamber 4 for intake and compression is compressed, while the portion of gas located rearward in the rotating direction is supplied a new mixed gas drawn in through the intake port 6. When the long slot 5b communicates with the paths 5a,5a' as the result of the shield plate 11 rotating together with the rotor 2, the transfer of the compressed gas in the chamber 4 completes itself; and when the communication is canceled by the shield plate 11, the sparking plug 7 in the chamber 4' acts to explode the gas and thereby the force given to the sealing piece 9' causes the rotor 2 to turn. Then the gas located forward in the rotating direction of the sealing piece 9' is discharged through the exhaust port 8. The rotation of the rotor 2 is transmitted out of the housing 1 through the rotor shaft 3.

The rotary engine according to the present invention has the following advantages:

(a) Energy loss is little, because the power of explosion is directly transmitted to the rotor shaft and the motion is not reciprocating but rotational in one direction.

(b) Manufacture is low-cost and the engine can be made compact, because the crank, valve and valve cam are rendered needless.

(c) As the engine rooms are divided into the intake and compression chamber and the expansion and exhaust chamber, various difficulties in design, performance, configuration and manufacture can be deleted.

(d) Unlike a Wankel type engine, the engine can be made in different variations depending on the use through various combinations of the expansion chamber and the compression chamber on the same shaft.

(e) Unlike a Wankel type engine, the engine needs no intricate epitrochoid and accordingly it can be produced at low cost.

(f) Compression ratio is freely adjustable.

(g) The compressed gas can be supplied fast and surely by the function of the shield plate and the gas seal.

(h) A single plug can perform the same function as a multicylinder engine, but a number of plugs may be used for simultaneous ignition and operation.

What is claimed is:

1. A rotary engine comprising a housing, a rotor within the housing arranged for rotation relative to the housing, wall means within the housing for separating the space between the rotor and the housing into at least one intake-compression chamber and at least one expansion-exhaust chamber, dividing means in each chamber on the interior surface of the housing in constant engagement with the exterior surface of the rotor, sealing means in each chamber connected to the rotor for movement therewith and having an outer end portion in constant engagement with the interior surface of the housing, an intake port in the housing communicating with the intake-compression chamber for supplying a combustible mixture to the intake-compression chamber, ignition means in the housing communicating with the expansion-exhaust chamber, an exhaust port in the housing communicating with the expansion-exhaust chamber, a transfer passageway in the wall means between the chambers with means for selectively opening and closing the passageway for transferring the compressed mixture from the intake-compression chamber to the expansion-exhaust chamber, and the chambers being constructed and arranged so that the volume of the intake-compression chamber decreases at a rate substantially equal to the rate of increase of the volume of the expansion-exhaust chamber when the transfer passageway is open whereby the compression of the mixture is maintained substantially constant during transfer from the intake-compression chamber to the expansion-exhaust chamber.

2. A rotary engine as in claim 1 wherein the dividing means in each chamber includes two spaced apart portions on the exterior surface of the housing in constant engagement with the exterior surface of the rotor.

* * * * *